(12) United States Patent
Limonad et al.

(10) Patent No.: US 10,504,036 B2
(45) Date of Patent: Dec. 10, 2019

(54) OPTIMIZING PERFORMANCE OF EVENT DETECTION BY SENSOR DATA ANALYTICS

(71) Applicant: International Business Machines Corporation, Armink, NY (US)

(72) Inventors: Lior Limonad, Nesher (IL); Nir Mashkif, Ein Carmel (IL); Segev E Wasserkrug, Haifa (IL); Alexander Zadorojniy, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 14/988,762

(22) Filed: Jan. 6, 2016

(65) Prior Publication Data

US 2017/0193395 A1 Jul. 6, 2017

(51) Int. Cl.
*G06N 20/00* (2019.01)
*G06F 11/30* (2006.01)

(52) U.S. Cl.
CPC .................. *G06N 20/00* (2019.01)

(58) Field of Classification Search
None
See application file for complete search history.

(56) References Cited

U.S. PATENT DOCUMENTS 7,292,960 B1 * 11/2007 Srinivasa ............... G06Q 10/06
340/500
8,909,497 B1 * 12/2014 Shkolnikov ............ G01P 15/00
340/573.1
2009/0156924 A1 * 6/2009 Shariati .............. A61B 5/14532
600/365
2012/0293323 A1 11/2012 Kaib et al.
2013/0340500 A1 12/2013 Miller et al.
(Continued)

FOREIGN PATENT DOCUMENTS

JP 5590301 B2 * 9/2014
WO 2011116340 9/2011

OTHER PUBLICATIONS

Sparacino, Giovanni, Andrea Facchinetti, and Claudio Cobelli. ""Smart" continuous glucose monitoring sensors: on-line signal processing issues." Sensors 10, No. 7 (2010): 6751-6772. (Year: 2010).*

(Continued)

*Primary Examiner* — Scott A. Waldron
*Assistant Examiner* — Casey R. Garner
(74) *Attorney, Agent, or Firm* — Ziv Glazberg

(57) ABSTRACT

A computer-implemented method, computerized apparatus and computer program product, the method comprising: obtaining data measured by one or more sensors; segmenting the data into a plurality of sliding windows; extracting one or more features from each of the plurality of sliding windows; analyzing, by a machine learning process, the extracted features to determine, for each sliding window, an activity detection in the sliding window; and determining an activity detection result in the data to be positive responsive to activity detection by the machine learning process in at least a number M of sliding windows out of a number N of consecutive sliding windows, wherein M>1.

16 Claims, 3 Drawing Sheets

(56) References Cited

U.S. PATENT DOCUMENTS

| | | | |
|---|---|---|---|
| 2014/0108324 A1* | 4/2014 | Chen | G06F 17/18 706/52 |
| 2015/0164377 A1* | 6/2015 | Nathan | A61B 5/1122 600/595 |
| 2015/0199010 A1* | 7/2015 | Coleman | A61B 5/0006 345/156 |
| 2016/0148103 A1* | 5/2016 | Sarrafzadeh | G06N 99/005 706/46 |
| 2016/0321257 A1* | 11/2016 | Chen | G06F 17/30784 |

OTHER PUBLICATIONS

Zhu, Ying. "Automatic detection of anomalies in blood glucose using a machine learning approach." Journal of Communications and Networks 13, No. 2 (2011): 125-131. (Year: 2011).*

Oresti Banos et al.,"Window size impact in human activity recognition", Sensors, 14(4), 6474-6499.body , 2014.

Andreas Bulling et al., "A tutorial on human activity recognition using body-worn inertial sensors", ACM Computing Surveys (CSUR), 46(3), 33, 2014.

Raul Igual et al., "Challenges, issues and trends in fall detection systems", BioMedical Engineering OnLine Dec. 2013. pp. 1-24.

Holger Junker et al., "Gesture spotting with body-worn inertial sensors to detect user activites", Journal Pattern Recognition archive, vol. 41 Issue 6, Jun. 2008, pp. 2010-2024.

Banos, Oresti, et al., A benchmark dataset to evaluate sensor displacement in activity recognition, UbiComp '12 Proceedings of the 2012 ACH Conference on Ubiquitous Computing, Pittsburgh Pennsylvania—Sep. 5-8, 2012, pp. 1026-1035.

* cited by examiner

OPTIMIZING PERFORMANCE OF EVENT DETECTION BY SENSOR DATA ANALYTICS

TECHNICAL FIELD

The present disclosure relates to data mining in general, and to optimizing performance of event detection by sensor data analytics, in particular.

BACKGROUND

Detection of events, activities or patterns using mathematical and statistical analysis of data measured by one or more sensors deployed in a place of interest is prominent in many practical applications as well as in research contexts. One rapidly evolving field is pattern and activity recognition using wearable sensors, i.e. sensors that can be mounted on a person's body for monitoring occurrences or behavior related to that person. Common types of wearable sensors include inertial sensors for measuring movements, such as accelerometers, gyroscopes, or the like, physiological sensors for measuring heart rate, body temperature, skin conductivity, or the like, and likewise sensing devices. Exemplary domains of recent applications for wearable sensors range from recreational and entertainment industries, such as games and fitness training, through medical research and healthcare services, and up to personal safety and wellness securing in general.

BRIEF SUMMARY

One exemplary embodiment of the disclosed subject matter is a computer-implemented method comprising: obtaining data measured by one or more sensors; segmenting the data into a plurality of sliding windows; extracting one or more features from each of the plurality of sliding windows; analyzing, by a machine learning process, the extracted features to determine, for each sliding window, an activity detection in the sliding window; and determining an activity detection result in the data to be positive responsive to activity detection by the machine learning process in at least a number M of sliding windows out of a number N of consecutive sliding windows, wherein M>1.

Another exemplary embodiment of the disclosed subject matter is a computerized apparatus having a processor, the processor being adapted to perform the steps of: obtaining data measured by one or more sensors; segmenting the data into a plurality of sliding windows; extracting one or more features from each of the plurality of sliding windows; analyzing, by a machine learning process, the extracted features to determine, for each sliding window, an activity detection in the sliding window; and determining an activity detection result in the data to be positive responsive to activity detection by the machine learning process in at least a number M of sliding windows out of a number N of consecutive sliding windows, wherein M>1.

Yet another exemplary embodiment of the disclosed subject matter is a computer program product comprising a computer readable storage medium retaining program instructions, which program instructions when read by a processor, cause the processor to perform a method comprising: obtaining data measured by one or more sensors; segmenting the data into a plurality of sliding windows; extracting one or more features from each of the plurality of sliding windows; analyzing, by a machine learning process, the extracted features to determine, for each sliding window, an activity detection in the sliding window; and determining an activity detection result in the data to be positive responsive to activity detection by the machine learning process in at least a number M of sliding windows out of a number N of consecutive sliding windows, wherein M>1.

Yet another exemplary embodiment of the disclosed subject matter is a computer-implemented method comprising: obtaining data measured by one or more sensors; receiving a time-based constraint on false positive rate of activity detections; and determining at least one parameter maximizing true positive rate of activity detections subject to the time-based constraint, said determining comprises the steps of: (a) selecting a value for the at least one parameter; (b) segmenting the data into a plurality of sliding windows; (c) extracting one or more features from each of the plurality of sliding windows; (d) analyzing, by a machine learning process, the extracted features to determine, for each sliding window, an activity detection result in the sliding window, whereby obtaining a plurality of activity detection results; (e) calculating false positive rate per time unit for the plurality of activity detection results based on the time-based constraint; (f) calculating true positive rate of the plurality of activity detection results; and (g) repeating steps (b) to (f) with one or more different values; wherein said segmenting, extracting, and analyzing are performed in accordance with the value.

Yet another exemplary embodiment of the disclosed subject matter is a computerized apparatus having a processor, the processor being adapted to perform the steps of: obtaining data measured by one or more sensors; receiving a time-based constraint on false positive rate of activity detections; and determining at least one parameter maximizing true positive rate of activity detections subject to the time-based constraint, said determining comprises the steps of: (a) selecting a value for the at least one parameter; (b) segmenting the data into a plurality of sliding windows; (c) extracting one or more features from each of the plurality of sliding windows; (d) analyzing, by a machine learning process, the extracted features to determine, for each sliding window, an activity detection result in the sliding window, whereby obtaining a plurality of activity detection results; (e) calculating false positive rate per time unit for the plurality of activity detection results based on the time-based constraint; (f) calculating true positive rate of the plurality of activity detection results; and (g) repeating steps (b) to (f) with one or more different values; wherein said segmenting, extracting, and analyzing are performed in accordance with the value.

Yet another exemplary embodiment of the disclosed subject matter is a computer program product comprising a computer readable storage medium retaining program instructions, which program instructions when read by a processor, cause the processor to perform a method comprising: obtaining data measured by one or more sensors; receiving a time-based constraint on false positive rate of activity detections; and determining at least one parameter maximizing true positive rate of activity detections subject to the time-based constraint, said determining comprises the steps of: (a) selecting a value for the at least one parameter; (b) segmenting the data into a plurality of sliding windows; (c) extracting one or more features from each of the plurality of sliding windows; (d) analyzing, by a machine learning process, the extracted features to determine, for each sliding window, an activity detection result in the sliding window, whereby obtaining a plurality of activity detection results; (e) calculating false positive rate per time unit for the plurality of activity detection results based on the time-based constraint; (f) calculating true positive rate of the plurality of activity detection results; and (g) repeating steps (b) to (f) with one or more different values; wherein said segmenting, extracting, and analyzing are performed in accordance with the value.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
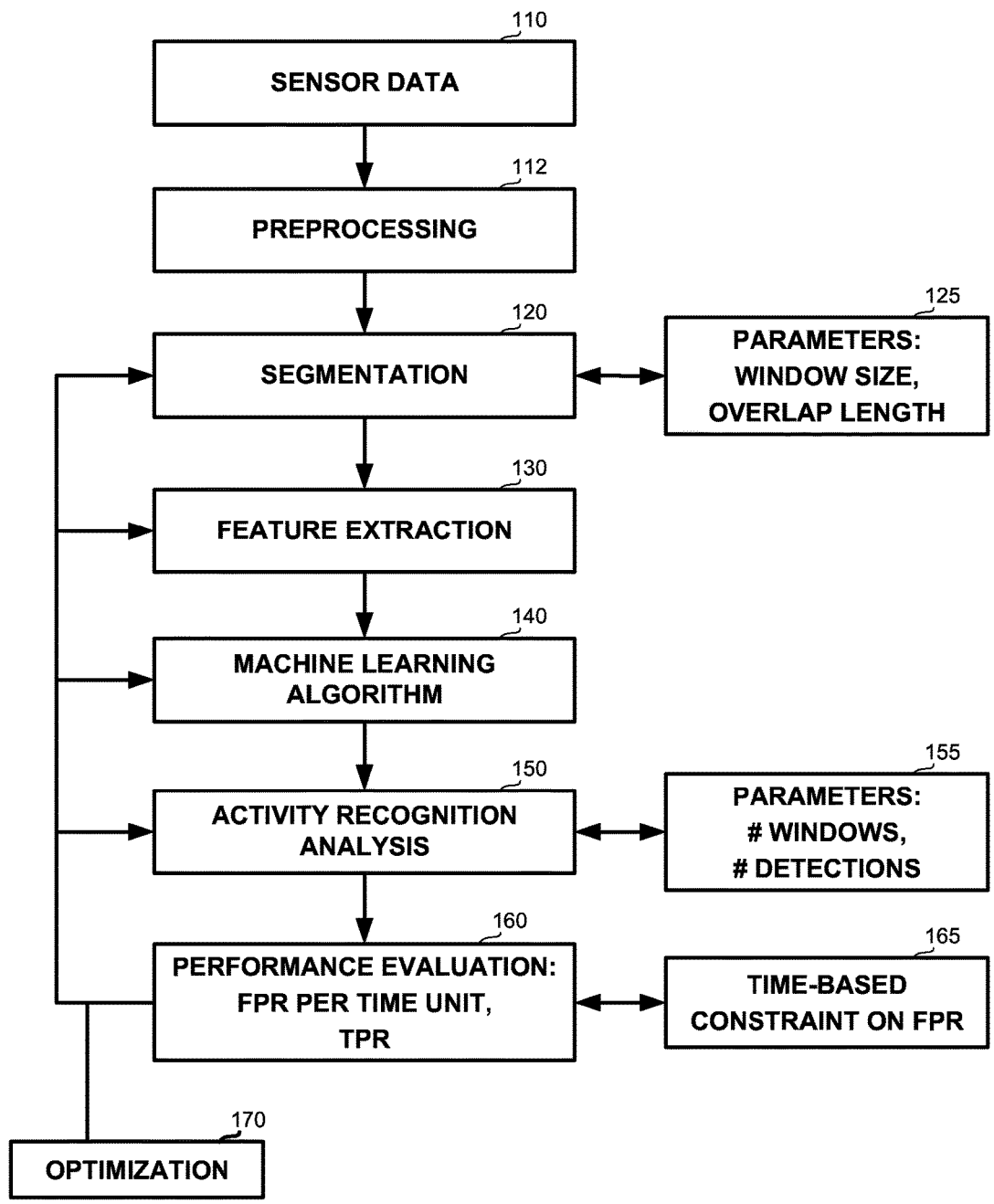
FIG. 1 shows a schematic exemplary environment in which the disclosed subject matter is used, in accordance with some exemplary embodiments of the subject matter.

One technical problem dealt with by the disclosed subject matter is to optimize event detection based on analytics of sensor data.

In one approach, a multi-stage procedure may be used for processing measured data of one or more sensors. On the first stage, optionally after an initial pre-processing step of cleaning and/or synchronizing multi-dimensional data streams, the data is segmented using a "sliding window" scheme, under which the data is divided to successive, relatively smaller portions according to a chosen window size. A typical window size in the context of wearable sensors analytics is several seconds long. At the next stage, features are extracted from the data in each window. Notably, as wearable sensors data is often multi-dimensional and collected at high frequencies (e.g., 50 Hz), even a small window can give rise to a significant amount of data. Extracted features may include simple statistics, such as signal mean, minimum and maximum, or the like, as well as more complicated operators, such as smoothed output of frequency analysis, e.g. periodogram, Fourier transform, or the like. Those features are then provided as input to one or more classification algorithms Numerous machine learning techniques, such as decision trees, support vector machines, k-Nearest Neighbors (k-NN), neural networks, Bayesian networks and the like, may be used at this final stage. Their output may provide classification of the considered interval into one of two or more activity classes. These classes may include the so-called "null-class" (no important activity registered), which may constitute the majority of observations in many practical problems.

Another technical problem dealt with by the disclosed subject matter is to select optimal parameters of data segmentation and/or analysis for activity recognition.

In one approach, standard statistical goodness-of-fit measures, based on percentage of correct classifications, may be used to decide on which of numerous pattern recognition machine learning algorithms is best for the task at hand, or which parameter, such as sliding window size, is the optimal one for a specific algorithm. Such measures may include, for example, an overall fraction of correct classifications, precision (the ratio between true positives and the sum of true and false positives), true positive rate (also known as recall or sensitivity), true negative rate (also known as specificity), F1-score (harmonic mean of precision and sensitivity), Area Under the Curve (AUC or AUROC; a measure relating to trade-offs between true and false positives), or the like.

Yet another technical problem dealt with by the disclosed subject matter is to accommodate performance of activity detection procedures to practical needs.

In some settings, detection of an activity or event may call for issuing an alert to a user or an interested party, such as a physician, manager, family relative, or the like. For example, wearable sensors may be employed for detecting patterns such as high body temperature due to heat stress, high heart rate due to overexertion, a fall of an elderly person or industrial worker, or the like. Such situations, where intervention by the notified party is often further solicited, might give rise to the undesired phenomenon of "alert fatigue", wherein a person exposed to multiple, frequent, possibly false alerts becomes consequently desensitized to them.

In scenarios of this sort, even pattern recognition algorithms with supposedly excellent results from a scientific perspective might yield unacceptable consequences in s a practical environment. As an illustrative example, consider an algorithm with specificity of 99.9%, which means one false alert among 1,000 normal observations. However, suppose for example that one-second sliding windows without overlapping are used, such specificity would translate to one false alert in 17 minutes of normal activity. Such false alert rate may not be considered tolerable by most people in the context of various practical applications.

One technical solution is to use a detection rule based on analysis of N successive sliding windows and a threshold number of M≤N event detections, instead of considering one sliding window at a time. The overall event detection result is determined to be positive only if the pattern is detected in at least M out of the N intervals checked, in which case issuance of an alert may optionally follow.

Another technical solution is to admit time-based constraints on false positive rate (FPR) of detected events, instead of using percent-based statistical measures exclusively for evaluating performance Such constraints may be formulated as maximal number of false positives per time unit. For example, in the context of pattern detection followed by an alert, the requirement may be specified as "no more than one false alert on average within 5 working shifts (40 hours)".

Yet another technical solution is to perform optimization over one or more parameters of a multi-stage event detection procedure to bring percent-based true positive rate (TPR) to a maximum given the time-based constraints on FPR. The optimization parameters may include, for example, segmentation parameters such as sliding window size, overlap length between subsequent sliding windows, or the like; detection rule parameters, such as number of consecutive sliding windows checked, threshold number of pattern detections, or the like; type of machine learning algorithm employed; parameters of the machine learning algorithm; type of features extracted; and the like.

One technical effect of utilizing the disclosed subject matter is to provide a framework for evaluating performance and adjusting parameters of multi-stage activity detection schemes for diverse types of pattern recognition problems.

In some exemplary embodiments, the framework may be employed for optimizing detection of periodical movement activities, such as running or eating movements, optionally followed by an alert issuance. For example, running could be an undesirable activity in industrial safety domain, and "eating alerts" could be given to people with dietary restrictions. Similarly, alerts related to different physiological parameters being monitored may constitute another example of appropriate settings for utilizing the disclosed subject matter.

In some exemplary embodiments, the optimization may be restricted to a subset of parameters while other parameters may be fixed. For example, in a setting such as recognition of single rare gestures in a large "null activity class", the gestures may take place during a single sliding window, so one may have no choice except trying to detect them during this window. Thus, in circumstances such as those, the detection rule parameters relating to a number N of consecutive sliding windows jointly analyzed, and a threshold number M of detected activities therein, respectively, may be constantly set to M=N=1, while other parameters, such as a sliding window size W, an overlap length V between successive windows, wherein $0 \leq V < W$, or the like, may still be optimized.

In some exemplary embodiments, combinations of different pattern detection protocols associated with different sets of parameters may be used for recognition of more complex or elaborated events. For example, in case of fall detection, while the fall event per se may be a brief one, actual fall detection may be performed by detecting brief acceleration fall pattern followed by an extended post-fall pattern, e.g., lack of movement.

Referring now to FIG. 1 showing a schematic exemplary environment in which the disclosed subject matter is used, in accordance with some exemplary embodiments of the subject matter.

The environment may comprise Sensor Data 110 measured by one or more sensors. In some exemplary embodiments, Sensor Data 110 may be obtained from wearable sensor or sensors. Sensor Data 110 may comprise supervised, historical training data, which may be labeled to indicate its correct classification. Additionally or alternatively, Sensor Data 110 may comprise new data being updated online, such as, for example, in an iterative implementation of the disclosed subject matter.

Sensor Data 110 may undergo an initial step of Preprocessing 112, which may comprise data cleaning, multi-dimensional data streams synchronization, and the like.

Next, Sensor Data 110 may be subjected to Segmentation 120, which may comprise division of Sensor Data 110 into a plurality of sliding windows, possibly with some overlap. Parameters 125 for Segmentation 120 may comprise a window size, an overlap length, and the like.

Feature Extraction 130 may then be performed on the plurality of sliding windows obtained by Segmentation 120 to extract various features for each window, such as signal mean, minimum, maximum, standard deviation, variance, median, Root Mean Square (RMS), power spectrum, and the like.

The extracted features may be provided as input to a Machine Learning Algorithm 140 for activity recognition. Machine Learning Algorithm 140 may be configured for providing a classification into one of several activities classes, including the "null activity class" corresponding to no activity of interest being detected. In some exemplary embodiments the classification may be binary, i.e. activity detected/not detected. Various data mining tools, such as IBM SPSS Modeler™ available from International Business Machines of Armonk N.Y., USA, may be employed in role of Machine Learning Algorithm 140. In some exemplary embodiments, Sensor Data 110 may be partitioned into training and testing sets for Machine Learning Algorithm 140 in accordance with any one of acceptable machine learning cross-validation techniques.

Next, Activity Recognition Analysis 150 may be performed on the classifications obtained from Machine Learning Algorithm 140 to determine an activity detection result in accordance with enhanced pattern recognition rules. Parameters 155 for Activity Recognition Analysis 150 may comprise a number of subsequent windows analyzed, a threshold number of activity detections among those intervals for determining an activity detection result in the data to be positive, and the like.

In some exemplary embodiments, a further action may be taken in response to the determination of an activity detection result as positive. For example, Sensor Data 110 may be data measured by a wearable inertial sensor worn by an elderly person, and in case of a positive result of fall event detection, an alert may be issued to a third party, such as a family kin or a care provider. As another example, Sensor Data 110 may be acquired by a blood glucose level monitor worn by a diabetes patient, and in response to detecting an abnormal level, a drug may be administered to the person automatically.

The detection results of Activity Recognition Analysis 150 may be provided to Performance Evaluation 160. A Time-Based Constraint on False Positive Rate (FPR) 165 may be received as input for Performance Evaluation 160. Performance Evaluation 160 may comprise calculating false positive rate per time unit, optionally based on Time-Based Constraint on FPR 165, calculating true positive rate (TPR), and the like. A positive result of Activity Recognition Analysis 150 may be determined by Performance Evaluation 160 to be true or false based on the actual label of the respective data instance provided therewith, in case that Sensor Data 110 is supervised, based on feedback received from a user, or the like.

Optimization 170 may be performed over one or more parameters, such as Parameters 125 for Segmentation 120, Parameters 155 for Activity Recognition Analysis 150, type of features extracted in Feature Extraction 130, type of Machine Learning Algorithm 140, and the like. The objective function of Optimization 170 may be maximizing TPR subject to FPR per time unit satisfying Time-Based Constraint 165. Optimization 170 may be performed iteratively by selecting values for the one or more parameters being optimized and repeating the procedure, starting at Segmentation 120 or a further stage, depending on the type of parameters for optimization, and up to Performance Evaluation 160, to obtain respective FPR per time unit and TPR measures for the selected value or combination of values. Optimization 170 may be performed by a computerized optimization device.

In some exemplary embodiments, Machine Learning Algorithm 140 may be associated with one or more parameters specific to its type. For example, in case that the type of Machine Learning Algorithm 140 is k-Nearest Neighbors (k-NN), wherein a class of an object is determined by a majority vote among its k nearest neighbors in the feature space, the associated specific parameters may comprise the value of k, weights assigned to contributions by different neighbors, and the like. In some exemplary embodiments, these parameters may be incorporated into the environment of FIG. 1 and Optimization 170 may be performed for them in addition to or in lieu of the other parameters or a portion thereof.

Figure 2:
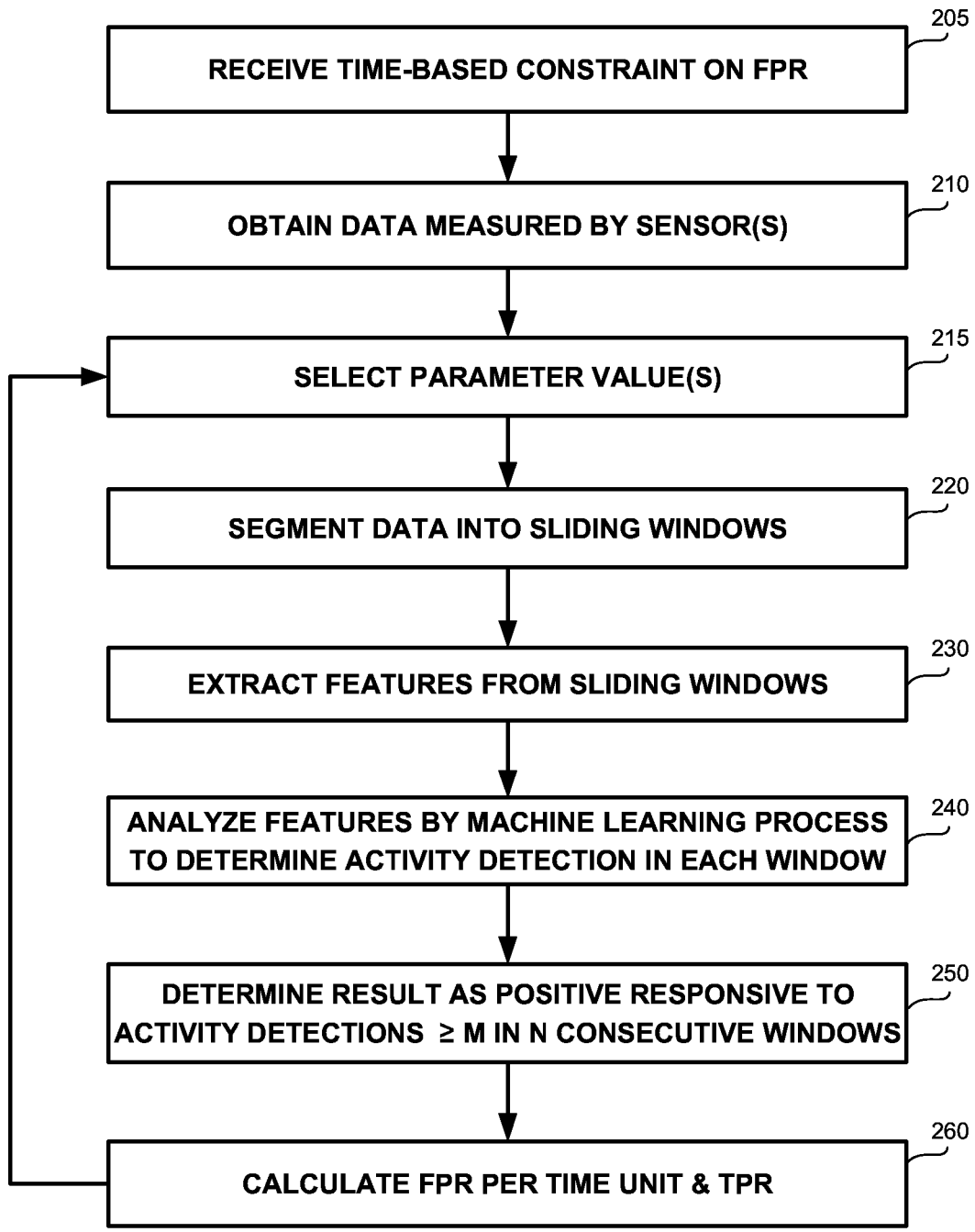
FIG. 2 shows a flowchart diagram of a method, in accordance with some exemplary embodiments of the subject matter.

Referring now to FIG. 2 showing a flowchart diagram of a method, in accordance with some exemplary embodiments of the subject matter.

On Step 205, a time-based constraint on false positive rate (FPR) of activity detections may be received. The constraint may specify a limit on a number of false positive results a per time unit T. For example, a constraint of "no more than one false positive on average during 40 hours" may be defined by $\alpha=1$ and $T=40$.

On Step 210, data measured by one or more sensors may be obtained. In some exemplary embodiments, the one or more sensors may be wearable. The data may be supervised, historical data. Additionally or alternatively, the data may be updated online.

On Step 215, a value for at least one parameter of activity recognition may be selected. The at least one parameter may comprise a sliding window size W; an overlap length V between successive sliding windows, wherein $0 \leq V < W$; a number N of sequential windows analyzed; a threshold number of sliding windows M in which activity was detected out of N subsequent windows; a type of feature extracted from sliding window; a type of machine learning procedure; a parameter of the machine learning procedure; and the like. In some exemplary embodiments, the at least one parameter may comprise a combination of the segmentation parameters W and V, a combination of the detection rule parameters N and M, a combination of both segmentation and detection rule parameters W, V, N and M, or the like.

On Step 220, the data obtained on Step 210 may be segmented into a plurality of sliding windows. The segmentation may be performed in accordance with parameter values selected for W and/or V on Step 215. In some exemplary embodiments, one or more segmentation parameters may be constant. For example, the overlap length may be set to $V=0$, and the window size may be set to $W=1$ second. As another example, the window size W may be defined as a variable with a range of admissible values while the overlap may be set to being constantly zero.

On Step 230, one or more features may be extracted from each of the sliding windows obtained by the data segmentation on Step 220. The extracted features may comprise simple statistical measures, such as mean, median, minimum, maximum, variance, Root Mean Square (RMS), or the like. Additionally or alternatively, the extracted features may comprise spectral analysis features, such as Fourier Transform coefficients, periodogram, or the like.

On Step 240, the features extracted on Step 230 may be analyzed by a machine learning process to determine an activity detection in the respective window. The machine learning process may be configured for classifying an input into one out of several activity classes. The machine learning process may apply one or more pattern recognition algorithms, such as decision trees, neural networks, Bayesian networks, support vector machines, k-Nearest Neighbors, support vector machines, and the like. In some exemplary embodiments, the classification may be binary, i.e. activity is either detected in the data (a 'positive' specimen) or not detected ('negative'). Additionally or alternatively, the classification may be non-binary, such as indicating a probability of matching a label (e.g., 70% "positive" specimen). In some exemplary embodiments, the data may be divided into a training set and a testing set for the machine learning process.

On Step 250, responsive to detecting activity in at least M sliding windows out of N consecutive sliding windows analyzed by the machine learning process on Step 240, an activity detection result in the data may be determined to be positive. The determination may be made in accordance with a value or values selected for one or both of the detection rule parameters N and M, respectively, on Step 215. In some exemplary embodiments, the threshold number M of activity detections may be defined as a function of N, wherein N may be either a constant or a variable, such as M=N, M=ceil (0.5*N), wherein ceil( ) denotes the ceiling operator mapping a number to the smallest following integer, or the like. In some exemplary embodiments, the value of N, and by result the value of M as well, may be fixed and set to one, i.e., the number of positive results may coincide with the number of activity detections in single sliding windows. Step 250 may be performed serially or in parallel on respective subsets of N consecutive sliding windows of the plurality of sliding windows obtained on Step 220, or of a corresponding testing set thereof, where applicable, thereby a plurality of activity detection results may be obtained.

On Step 260, false positive rate (FPR) per time unit and true positive rate (TPR) may be calculated for the plurality of activity detection results obtained through the determination performed on Step 250. The calculation of FPR per time unit may be in accordance with a time unit T specified by the time-based constraint received on Step 205. The method may then proceed to select a different value for the at least one parameter and repeat from Step 215 to Step 260, whereby at least one parameter maximizing TPR given the constraint on FPR per time unit may be determined. In some exemplary embodiments, the method be performed by a solver of optimization problems. The optimization may be over the parameters V, W, M, N and the problem formulated as "max(E(TPR(V, W, M, N)) s.t. E(FPR(V, W, M, N, T))$\leq \alpha$", wherein T and a may be specified by the time-based constraint received on Step 205.

Figure 3:
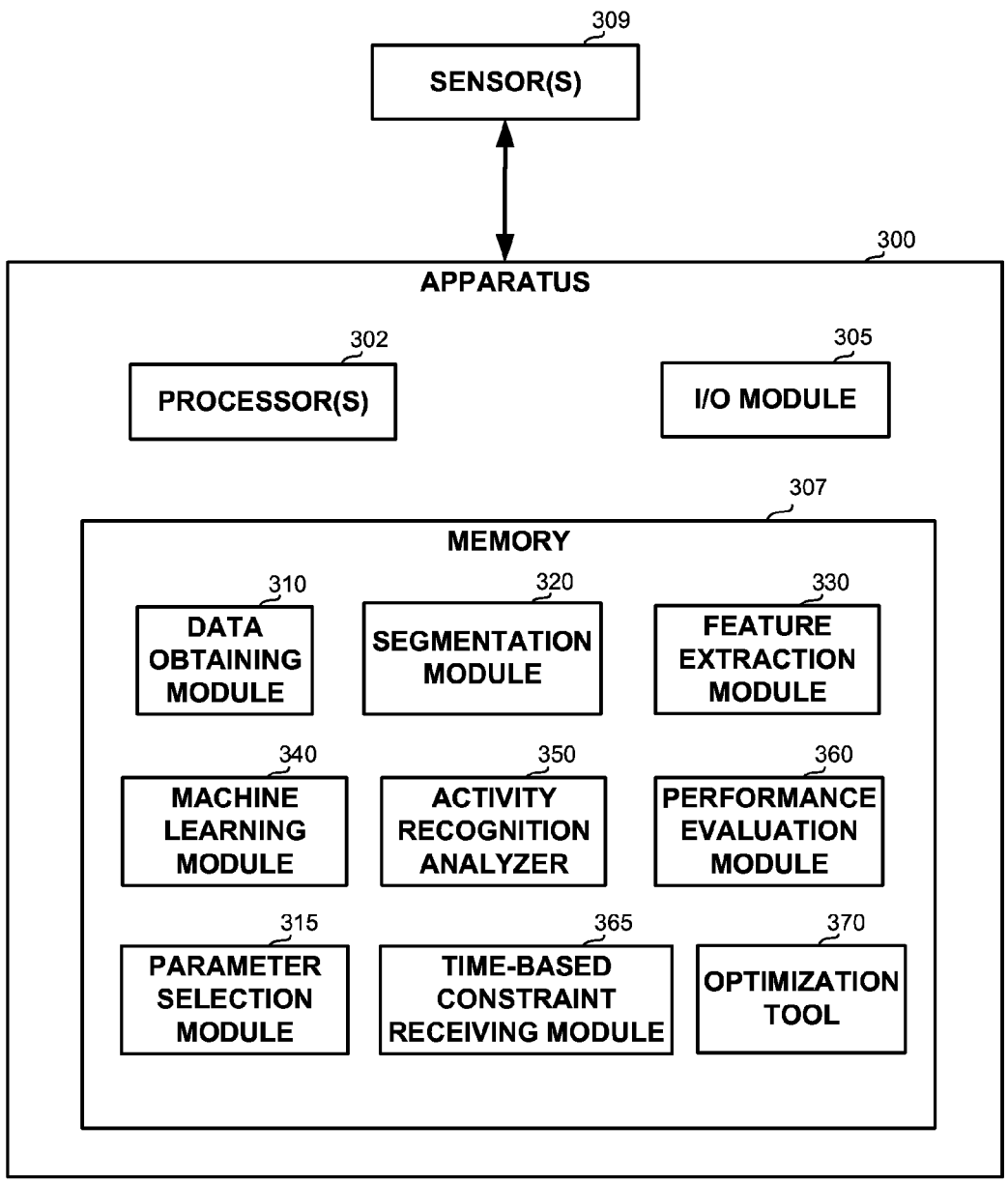
FIG. 3 shows a block diagram of an apparatus, in accordance with some exemplary embodiments of the disclosed subject matter.

Referring now to FIG. 3 showing an apparatus in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized to provide an output to and receive input from a user or another Apparatus 300.

In some exemplary embodiments, Apparatus 300 may comprise a Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, Apparatus 300 may be coupled with one or more Sensor(s) 309. Sensor 309 may be configured for measuring an activity related property. In some exemplary embodiments, Sensor 309 may be wearable. Sensor 309 may be an inertial sensor configured for measuring movements, such as an accelerometer, a gyroscope, or the like. Alternatively, Sensor 309 may be configured for measuring a physiological condition, such as heart rate, body temperature, skin conductivity, blood glucose level, or the like.

In some exemplary embodiments, Memory 307 may comprise a Data Obtaining Module 310. Data Obtaining Module 310 may be configured for obtaining s data measured by Sensor 309. Data Obtaining Module 310 may utilize I/O Module 305 for communicating with Sensor 309, or with another Apparatus 300 retaining measured data. In some exemplary embodiments, Data Obtaining Module 310 may be configured for receiving supervised, historical data. Additionally or alternatively, Data Obtaining Module 310 may be configured for receiving online updated new data from Sensor 309.

In some exemplary embodiments, Memory 307 may comprise a Preprocessing Module (not shown), configured for performing one or more preprocessing steps on the data obtained by Data Obtaining Module 310, such as data cleaning, multi-dimensional data streams synchronization, and the like.

In some exemplary embodiments, Memory 307 may comprise a Segmentation Module 320. Segmentation Module 320 may be configured for segmenting sensor data obtained by Data Obtaining Module 310 into a plurality of sliding windows. Segmentation Module 320 may perform the segmentation in accordance with one or more segmentation parameters, such as a sliding window size W, an overlap length V between subsequent sliding windows, wherein 0≤V<W, and the like.

In some exemplary embodiments, Memory 307 may comprise a Feature Extraction Module 330. Feature Extraction Module 330 may be configured for extracting one or more features from each of the plurality of sliding windows obtained by Segmentation Module 320. The extracted features may include statistical measures, spectral analysis measures, and the like.

In some exemplary embodiments, Memory 307 may comprise a Machine Learning Module 340. Machine Learning Module 340 may be configured to determine activity detection in a sliding window based on the extracted features obtained by Feature Extraction Module 330. Machine Learning Module 340 may apply on the extracted features one or more machine learning algorithms, configured for providing a classification of an input into one of several activity classes. A machine learning algorithm employed by Machine Learning Module 340 may be associated with one or more parameters specific to its type. In some exemplary embodiments, Machine Learning Module 340 may be configured for using a first portion of the data obtained by Data Obtaining Module 310 as training set, and a second portion of that data as testing set.

In some exemplary embodiments, Memory 307 may comprise an Activity Recognition Analyzer 350. Activity Recognition Analyzer 350 may be configured for determining an activity detection result in the data obtained by Data Obtaining Module 310, in accordance with an enhanced detection rule associated with one or more parameters. In some exemplary embodiments, Activity Recognition Analyzer 350 may be configured for determining a positive activity detection result in the data responsive to activity detection by Machine Learning Module 340 in at least an integer number M of sliding windows out of an integer number N of consecutive sliding windows, wherein 1≤M≤N. In some exemplary embodiments, Activity Recognition Analyzer 350 may be configured for analyzing, either serially or in parallel, subsets of N consecutive sliding windows of the plurality of sliding windows obtained by Segmentation Module 320, or a respective portion thereof used as testing set by Machine Learning Module 340, to obtain a plurality of activity detection results.

In some exemplary embodiments, Memory 307 may comprise a Performance Evaluation Module 360. Performance Evaluation Module 360 may be configured for calculating false positive rate (FPR) per time unit and true positive rate (TPR), based on the plurality of activity detection results obtained by Activity Recognition Analyzer 350. In some exemplary embodiments, Memory 307 may comprise a Time-Based Constraint Receiving Module 365, configured for receiving a time-based constraint on FPR. Time-Based Constraint Receiving Module 365 may be configured for obtaining a time unit T and a limit a on the number of false positives for a period duration of T. In some exemplary embodiments, Performance Evaluation Module 360 may be configured for calculating FPR per time unit based on the constraint received by Time-Based Constraint Receiving Module 365.

In some exemplary embodiments, Memory 307 may comprise a Parameter Selection Module 315. Parameter Selection Module 315 may be configured for selecting at least one parameter of activity recognition and a value therefor. In some exemplary embodiments, the at least one parameter selected by Parameter Selection Module 315 may be a parameter of Segmentation Module 320, such as window size W, overlap length V or the like; a parameter of Feature Extraction Module 330, such as a type of feature extracted or the like; a parameter of Machine Learning Module 340, such as a type of machine learning algorithm utilized, a specific parameter of the machine learning algorithm, or the like; a parameter of Activity Recognition Analyzer 350, such as number of windows checked N, threshold number of activity detections, or the like; and any combination thereof.

In some exemplary embodiments, Memory 307 may comprise an Optimization Tool 370. Optimization Tool 370 may be configured for performing optimization of activity detection with respect to performance measures calculated by Performance Evaluation Module 360. Optimization Tool 370 may be configured for determining at least one parameter value selected by Parameter Selection Module 315 to be optimal. In some exemplary embodiments, Optimization Tool 370 may be configured for solving the problem formulated as: max(E(TPR(V, W, M, N)) s.t. E(FPR(V, W, M, N, T))≤α.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A computer-implemented method comprising:
obtaining data measured by one or more sensors, the data corresponding to a blood glucose level;
segmenting the data into a plurality of sliding windows;

extracting one or more features from each of the plurality of sliding windows;

analyzing, by a machine learning process, the extracted features to determine, for each sliding window, an activity detection in the sliding window; and determining an activity detection result in the data to be positive responsive to activity detection by the machine learning process in at least a number M of sliding windows out of a number N of consecutive sliding windows, wherein M>1 and N>0, wherein M and N are activity detection parameters;

automatically administering a drug to a patient in response to the activity detection result indicating the blood glucose level is outside of a predetermined range;

determining a number of false positives and a number of true positives encountered over a plurality of activity detection results; and optimize the activity detection parameters by, at least in part, adjusting M and N to maximize the number of true positives while maintaining the number of false positives encountered over a specified time period below a threshold number of false positives.

2. The computer-implemented method of claim 1, further comprising:

receiving a time-based constraint on false positive rate of activity detections, wherein the time-based constraint comprises the threshold number of false positives allowed over the specified time window.

3. The computer-implemented method of claim 1, wherein the activity detection parameters further comprise at least one parameter selected from the group consisting of: a sliding window size; an overlap length between consecutive sliding windows; a type of classification algorithm utilized by the machine learning process; a parameter of classification algorithm utilized by the machine learning process; and type of features extracted.

4. The computer-implemented method of claim 1, wherein said determining comprises the steps of:
(a) selecting a value for the activity detection parameters prior to said segmenting, extracting, analyzing, and determining;
(b) performing said segmenting, extracting, analyzing, and determining in accordance with the values to obtain a plurality of activity detection results; and
(e) repeating steps (b) to (d) with one or more different values.

5. The computer-implemented method of claim 1, wherein the data is supervised.

6. The computer-implemented method of claim 1, wherein said optimizing the activity detection parameters comprises: using a first portion of the data as training set for the machine learning process; and using a second portion of the data as testing set for the machine learning process.

7. The computer-implemented method of claim 1, wherein the one or more sensors are wearable sensors.

8. The computer-implemented method of claim 1, further comprising preprocessing the data prior to said segmenting, the preprocessing comprising at least one step from the group consisting of: cleaning; and multi-dimensional synchronization.

9. The computer-implemented method of claim 1, further comprising issuing an alert responsive to determining the activity detection result to be positive.

10. A computer-implemented method comprising:
obtaining data measured by one or more sensors, the data corresponding to a blood glucose level;

receiving a time-based constraint on false positive rate of activity detections, wherein the time-based constraint comprises a maximum number of false positives over a specified time window;

determining at least one parameter maximizing true positive rate of activity detections subject to the time-based constraint, wherein the at least one parameter comprises a number M of sliding windows and a number N of consecutive sliding windows, wherein M>1 and N>0, said determining comprises the steps of:
(a) selecting a value for the at least one parameter;
(b) segmenting the data into a plurality of N sliding windows;
(c) extracting one or more features from each of the plurality of N sliding windows;
(d) analyzing, by a machine learning process, the extracted features to determine, for each sliding window, an activity detection result in the sliding window to obtain a plurality of activity detection results, wherein a positive result is indicated if the plurality of activity detection results are positive for at least N consecutive windows;
(e) calculating a number of false positives for the plurality of activity detection results;
(f) calculating true positive rate of the plurality of activity detection results; and
(g) repeating steps (b) to (f) with one or more different values for M and N to identify values of M and N that maximize the true positive rate while maintaining the number of false positives encountered over the specified time period below the maximum number of false positives;

wherein said segmenting, extracting, and analyzing are performed in accordance with the values; and automatically administering a drug to a patient in response to the activity detection result indicating the blood glucose level is outside of a predetermined range.

11. A computerized apparatus having a processor, the processor being adapted to perform the steps of:
obtaining data measured by one or more sensors, the data corresponding to a blood glucose level;
segmenting the data into a plurality of sliding windows;
extracting one or more features from each of the plurality of sliding windows;
analyzing, by a machine learning process, the extracted features to determine, for each sliding window, an activity detection in the sliding window;
determining an activity detection result in the data to be positive responsive to activity detection by the machine learning process in at least a number M of sliding windows out of a number N of consecutive sliding windows, wherein M>1 and N>0, wherein M and N are activity detection parameters; and
automatically administering a drug to a patient in response to the activity detection result indicating the blood glucose level is outside of a predetermined range;
determining a number of false positives and a number of true positives encountered over a plurality of activity detection results; and
optimize the activity detection parameters by, at least in part, adjusting M and N to maximize the number of true positives while maintaining the number of false positives encountered over a specified time period below a threshold number of false positives.

12. The computerized apparatus of claim 11, wherein the activity detection parameters further comprise at least one parameter selected from the group consisting of: a sliding window size; an overlap length between consecutive sliding windows; a type of classification algorithm utilized by the machine learning process; a parameter of classification algorithm utilized by the machine learning process; and type of features extracted.

13. The computerized apparatus of claim 11, wherein said determining comprises the steps of:
   (a) selecting a value for the activity detection parameters prior to said segmenting, extracting, analyzing, and determining;
   (b) performing said segmenting, extracting, analyzing, and determining in accordance with the values to obtain a plurality of activity detection results; and
   (e) repeating steps (b) to (d) with one or more different values.

14. A computerized apparatus having a processor, the processor being adapted to perform the steps of:
   obtaining data measured by one or more sensors, the data corresponding to a blood glucose level;
   receiving a time-based constraint on false positive rate of activity detections, wherein the time-based constraint comprises a maximum number of false positives over a specified time window;
   determining at least one parameter maximizing true positive rate of activity detections subject to the time-based constraint, wherein the at least one parameter comprises a number M of sliding windows and a number N of consecutive sliding windows, wherein M>1 and N>0, said determining comprises the steps of:
   (a) selecting a value for the at least one parameter;
   (b) segmenting the data into a plurality of N sliding windows;
   (c) extracting one or more features from each of the plurality of N sliding windows;
   (d) analyzing, by a machine learning process, the extracted features to determine, for each sliding window, an activity detection result in the sliding window to obtain a plurality of activity detection results, wherein a positive result is indicated if the plurality of activity detection results are positive for at least N consecutive windows;
   (e) calculating a number of false positives for the plurality of activity detection results;
   (f) calculating true positive rate of the plurality of activity detection results; and
   (g) repeating steps (b) to (f) with one or more different values for M and N to identify values of M and N that maximize the true positive rate while maintaining the number of false positives encountered over the specified time period below the maximum number of false positives;
   wherein said segmenting, extracting, and analyzing are performed in accordance with the values; and
   automatically administering a drug to a patient in response to the activity detection result indicating the blood glucose level is outside of a predetermined range.

15. A computer program product comprising a computer readable storage medium retaining program instructions, which program instructions when read by a processor, cause the processor to perform a method comprising:
   obtaining data measured by one or more sensors, the data corresponding to a blood glucose level;
   segmenting the data into a plurality of sliding windows;
   extracting one or more features from each of the plurality of sliding windows;
   analyzing, by a machine learning process, the extracted features to determine, for each sliding window, an activity detection in the sliding window;
   determining an activity detection result in the data to be positive responsive to activity detection by the machine learning process in at least a number M of sliding windows out of a number N of consecutive sliding windows, wherein M>1 and N>0, wherein M and N are activity detection parameters; and
   automatically administering a drug to a patient in response to the activity detection result indicating the blood glucose level is outside of a predetermined range;
   determining a number of false positives and a number of true positives encountered over a plurality of activity detection results; and
   optimize the activity detection parameters by adjusting M and N to maximize the number of true positives while maintaining the number of false positives encountered over a specified time period below a threshold number of false positives.

16. A computer program product comprising a computer readable storage medium retaining program instructions, which program instructions when read by a processor, cause the processor to perform a method comprising:
   obtaining data measured by one or more sensors, the data corresponding to a blood glucose level;
   receiving a time-based constraint on false positive rate of activity detections, wherein the time-based constraint comprises a maximum number of false positives over a specified time window;
   determining at least one parameter maximizing true positive rate of activity detections subject to the time-based constraint, wherein the at least one parameter comprises a number M of sliding windows and a number N of consecutive sliding windows, wherein M>1 and N>0, said determining comprises the steps of:
   (a) selecting a value for the at least one parameter;
   (b) segmenting the data into a plurality of N sliding windows;
   (c) extracting one or more features from each of the plurality of N sliding windows;
   (d) analyzing, by a machine learning process, the extracted features to determine, for each sliding window, an activity detection result in the sliding window to obtain a plurality of activity detection results;
   (e) calculating a number of false positives for the plurality of activity detection results;
   (f) calculating true positive rate of the plurality of activity detection results; and
   (g) repeating steps (b) to (f) with one or more different values for M and N to identify values of M and N that maximize the true positive rate while maintaining the number of false positives encountered over the specified time period below the maximum number of false positives;
   wherein said segmenting, extracting, and analyzing are performed in accordance with the values; and
   automatically administering a drug to a patient in response to the activity detection result indicating the blood glucose level is outside of a predetermined range.

* * * * *